United States Patent [19]

Kotani et al.

[11] Patent Number: 5,669,685
[45] Date of Patent: Sep. 23, 1997

[54] GAME MACHINE CAPABLE OF CREATING THREE-DIMENSIONAL VISUAL EFFECTS

[75] Inventors: Hideki Kotani; Kuniaki Kakuwa, both of Kobe, Japan

[73] Assignee: Konami Co., Ltd., Hyogo-ken, Japan

[21] Appl. No.: 602,646

[22] Filed: Feb. 16, 1996

[30] Foreign Application Priority Data

Feb. 17, 1995 [JP] Japan .................. 7-029743

[51] Int. Cl.⁶ .................................. G03B 21/14
[52] U.S. Cl. .................................. 353/28; 463/5
[58] Field of Search .................. 353/28, 30, 98, 353/10; 463/5; 359/630, 478

[56] References Cited

U.S. PATENT DOCUMENTS

| | | | |
|---|---|---|---|
| 3,707,115 | 12/1972 | Rush | 353/121 |
| 4,189,145 | 2/1980 | Stubben et al. | |
| 4,306,768 | 12/1981 | Egging | |
| 4,490,745 | 12/1984 | Erickson et al. | 273/85 G |
| 4,710,873 | 12/1987 | Breslow et al. | 364/410 |
| 4,786,925 | 11/1988 | Landwehr | 353/28 |
| 5,190,286 | 3/1993 | Watanabe et al. | 463/5 |
| 5,221,083 | 6/1993 | Dote | |
| 5,221,937 | 6/1993 | Machtig | 353/47 |
| 5,368,309 | 11/1994 | Monroe et al. | 353/30 |
| 5,457,508 | 10/1995 | Ichihara et al. | 353/30 |

FOREIGN PATENT DOCUMENTS

| | | |
|---|---|---|
| 39 990/85 | 9/1986 | Australia . |
| 0477861A2 | 4/1992 | European Pat. Off. . |
| 3-131288 | 6/1991 | Japan . |
| 4-134489 | 5/1992 | Japan . |

*Primary Examiner*—William Dowling
*Attorney, Agent, or Firm*—Jordan and Hamburg

[57] ABSTRACT

A game machine includes a diorama mounting cabinet on the front side containing a diorama object and a semitransparent mirror and a projector mounting cabinet on the rear side containing a cathode ray tube and a screen. An image displayed on the cathode ray tube is projected onto the screen in such a way that it is superimposed on a virtual image of the diorama object, as viewed form a player. The cathode ray tube and screen are integrally mounted in a projector housing which is made movable within the projector mounting cabinet. This makes it possible to vary relative positions of the individual images in depth directions so that depth relationships therebetween can be changed to provide increased reality and flexibility in three-dimensional visual presentation.

12 Claims, 4 Drawing Sheets

GAME MACHINE CAPABLE OF CREATING THREE-DIMENSIONAL VISUAL EFFECTS

BACKGROUND OF THE INVENTION

This invention relates to a game machine which can provide a realistic three-dimensional visual presentation by overlaying an image produced by diorama on an image presented on a display device such as a cathode ray tube (hereinafter referred to as CRT).

There have been known several techniques of creating such three-dimensional visual effects for game machines.

Japanese Unexamined Patent Publication No. 3-131288 discloses an arrangement including a semitransparent mirror mounted at a slant angle of 45 degrees, a CRT screen provided above the semitransparent mirror and a diorama object located behind the semitransparent mirror, as viewed from a player's position. An image produced from the diorama object passes through the semitransparent mirror while an image presented on the CRT screen is reflected to the front by the semitransparent mirror so that the player can see a combination of both images as a single pictorial composition.

Japanese Unexamined Patent Publication No. 4-134489 discloses an arrangement including a semitransparent mirror mounted at a slant angle of 45 degrees, a diorama object provided below the semitransparent mirror and a CRT screen located beside the semitransparent mirror. An image produced from the diorama object passes through the semi-transparent mirror while an image on the CRT screen is reflected upward by the semitransparent mirror. A combination of both images joined to form a single pictorial composition is reflected forward (i.e., toward a player's position) by a total reflection mirror.

Although either of the above-mentioned conventional arrangements can give a three-dimensional visual effect by superimposing the images of a diorama object and CRT presentation, neither of them can represent variations in depth relationships between the two images, or their relative distances from the player's point of view. It may be possible to change the diorama object or the image shown on the CRT screen to compensate for the lack of reality of perspective presentation. However, even when image contents are changed, depth relationships between the image of the diorama object and the image shown on the CRT screen remain unchanged and, therefore, it is not possible to vary their relative distances perceived by the player.

SUMMARY OF THE INVENTION

It is an object of the invention to provide a game machine having a three-dimensional visual effect which has overcome the problems residing in the prior art.

It is another object of the invention to provide a game machine having a three-dimensional visual effect which can substantially improve the reality of visual effects by making it possible to vary relative distances of individual images to be joined together to form a single pictorial composition.

According to the invention, a game machine comprising: a diorama object; and an image generator arranged behind the diorama object in such a way that an image formed by the image generator is superimposed on an image of the diorama object in a specified depth relation, and the image of the diorama object and the image formed by the image generator are movable in depth directions relative to each other.

It may be preferable to arrange the diorama object outside a viewing zone of the image formed by the image generator, and further provide a virtual image forming device which forms a virtual image of the diorama object over the image formed by the image generator. The virtual image forming device may be provided with a semitransparent mirror which is disposed between the diorama object and the image formed by the image generator in such a posture as to reflect the image of the diorama object to a player.

It may be appreciated that the diorama object has the shape of a human face; and the image generator is operable to form at least an image of eyes at a position appropriately corresponding to the virtual image of the diorama object. The relative movement of the virtual image of the diorama object and the image formed by the image generator may be set in such a range that the image of eyes is at least behind the virtual image of the diorama object. Also, the relative movement of the virtual image of the diorama object and the image formed by the image generator may be set in such a range that the image of eyes is either behind or in front of the virtual image of the diorama object. Further, it may be preferable to further provide a mechanism which moves the image of eyes between front and rear positions of the virtual image of the diorama object.

The image generator may be preferably made movable in depth directions. The image generator may be provided with a projector housing movable in depth directions: a screen provided in the housing; and a projector provided in the housing for projecting a desired image on the screen. It may be appreciated to provide a diorama housing supporting the diorama object, the diorama housing having a portion for holding the projector housing in a plurality of positions different from one another in depth directions. Also, it may be appreciated to provide a drive mechanism which moves the projector housing in depth directions relative to the diorama housing.

The game machine thus constructed produces a three-dimensional visual effect by superimposing the image formed by the image generator and the image of the diorama object at a different relative distance from the player's point of view. Accordingly, the relative position of the image formed by the image generator and the image of the diorama object can be varied in depth directions. Thus, their depth relationship can be changed to increase the flexibility of three-dimensional visual presentation.

There is provided the virtual image forming device for forming a virtual image of the diorama object. Comparing to direct superimposition of the formed image on the diorama object, accordingly, combination of a diorama object image and a formed image can be accomplished with more ease and flexibility because of the fact that the diorama object image is a virtual image.

Also, the virtual image forming device includes a semi-transparent mirror. This is effective in that the player not recognize the existence of the diorama object itself so that the visual presentation becomes more realistic.

Further, the diorama object is formed with the shape of a human face and an image of eyes is superimposed at an appropriate position on an image of the face-shaped diorama object. The relative movement of the virtual diorama object image and the formed eye image is set in such a range to position the image of eyes at least behind the virtual diorama object image, or in such a range to position the image of eyes either behind or in front of the virtual diorama object image. This makes it possible to move the eyes of the facial image between their recessed and projected positions, for instance, to give increased variations in facial features. Also, this makes it possible to adjust the relative movement range of the eye image and the virtual diorama object image in accordance with the size of the diorama object to ensure the superimposition of the eye image at an appropriate position of the virtual diorama object image regardless of the viewing angle of the player even when the diorama object is replaced with another one having a different size. Moreover, there is the moving mechanism for moving the image of eyes between front and rear positions of the virtual diorama object image. This will make it possible to automatically make the relative movement of the image of eyes and the virtual diorama object image.

The image generator is moved in depth directions. Accordingly, the relative movement of an image of the diorama object and a formed image can be varied by just moving the image generator in the depth directions.

The projector is arranged in the projector housing which is provided with the screen and is movable in depth directions. Compared to a conventional arrangement in which a CRT screen is directly placed in the player's line of sight, this enables forming of a larger image with a simple construction. Also, the relative movement of the diorama object image and the formed image can be more easily varied by just moving the whole projector housing. Further, the diorama housing is formed with the portion for holding the projector housing in a plurality of different positions. This will assure stable superimposition of the formed image and the diorama object image. Furthermore, there is provided the drive mechanism for moving the projector housing in depth directions relative to the diorama housing. Accordingly, the projector housing can be moved backward and forward readily even during execution of a game.

These and other objects, features and advantages of the present invention will become more apparent upon a reading of the following detailed description and accompanying drawings.

DETAILED DESCRIPTION OF THE PREFERRED EMBODIMENTS OF THE INVENTION

Figure 1:
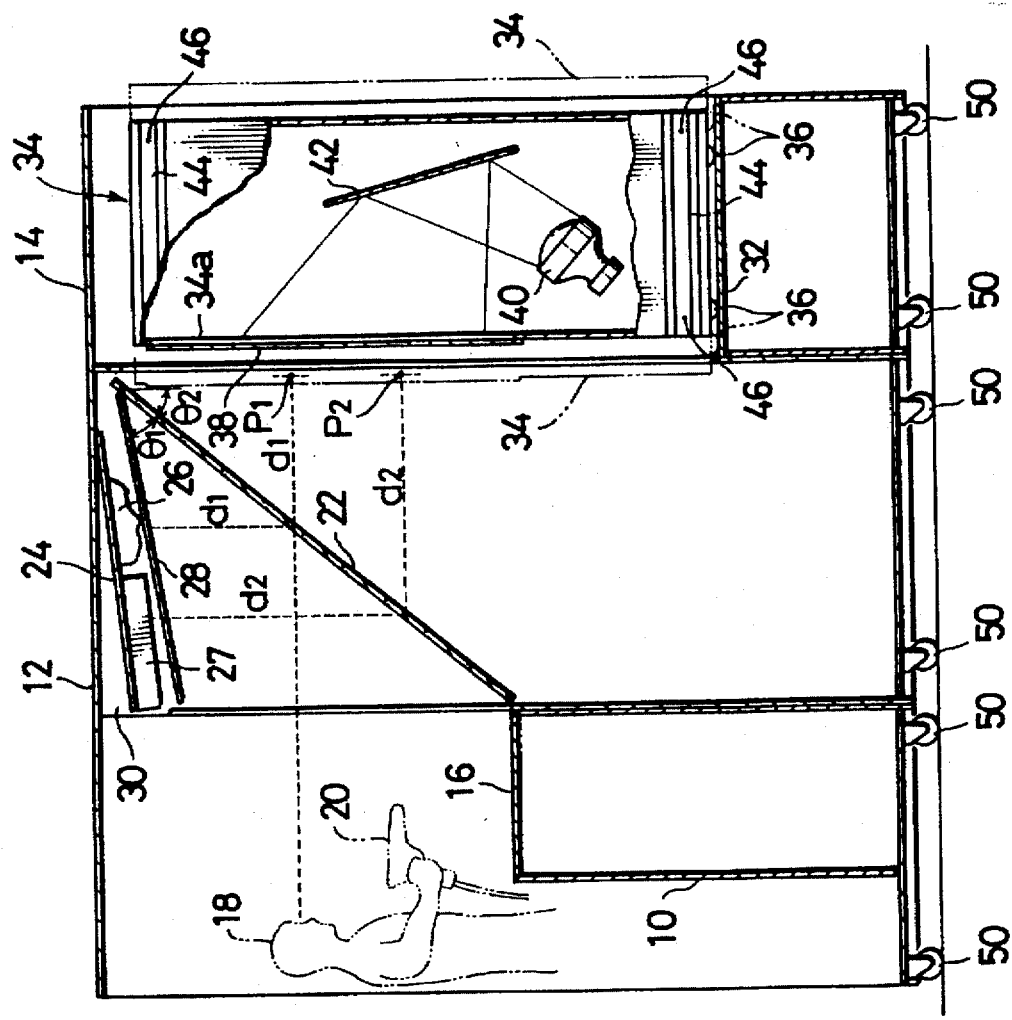
FIG. 1 is a vertical sectional view of a game machine according to the invention.
Figure 2:
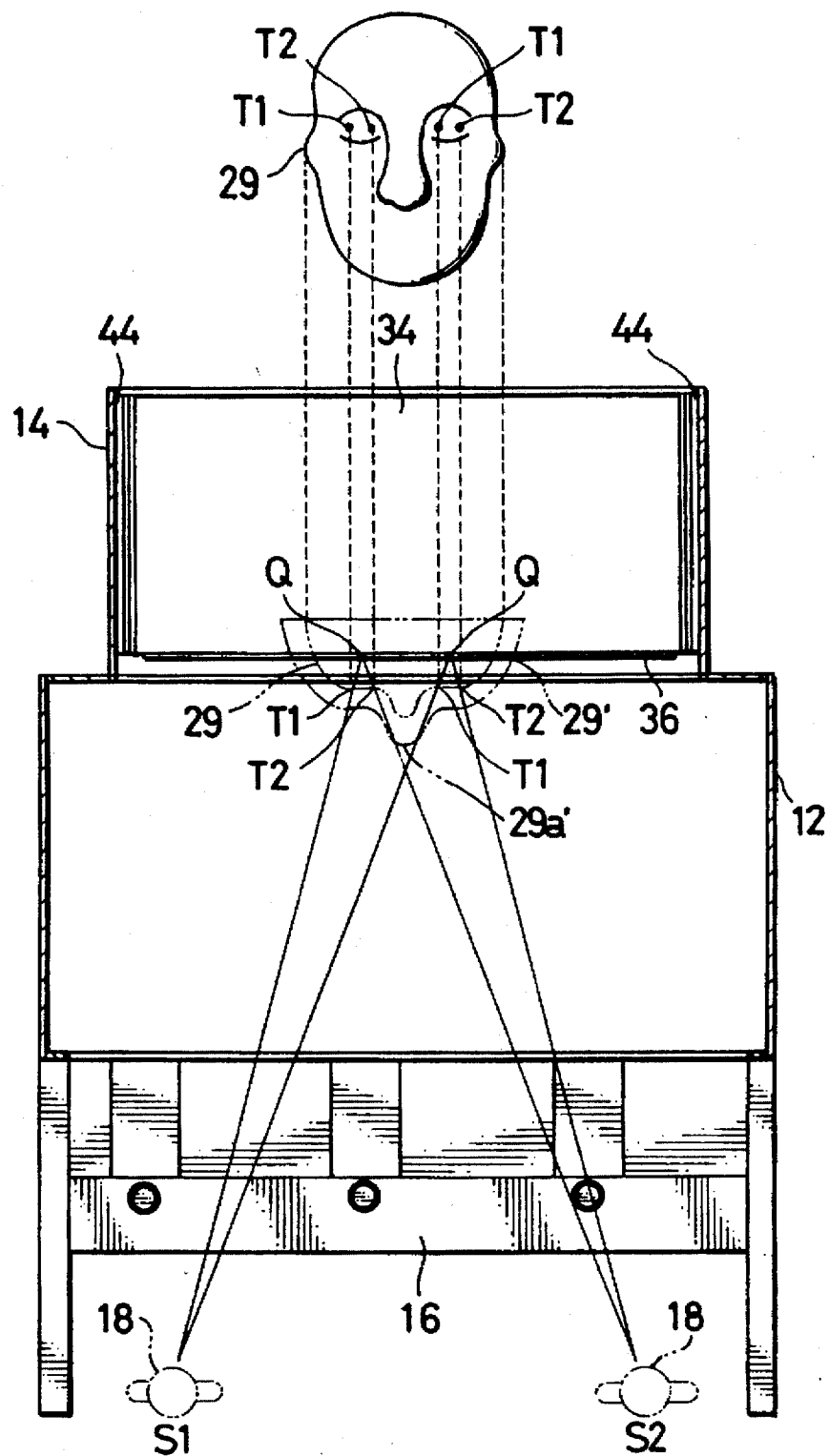
FIG. 2 is a horizontal sectional view of the game machine.
Figure 3:
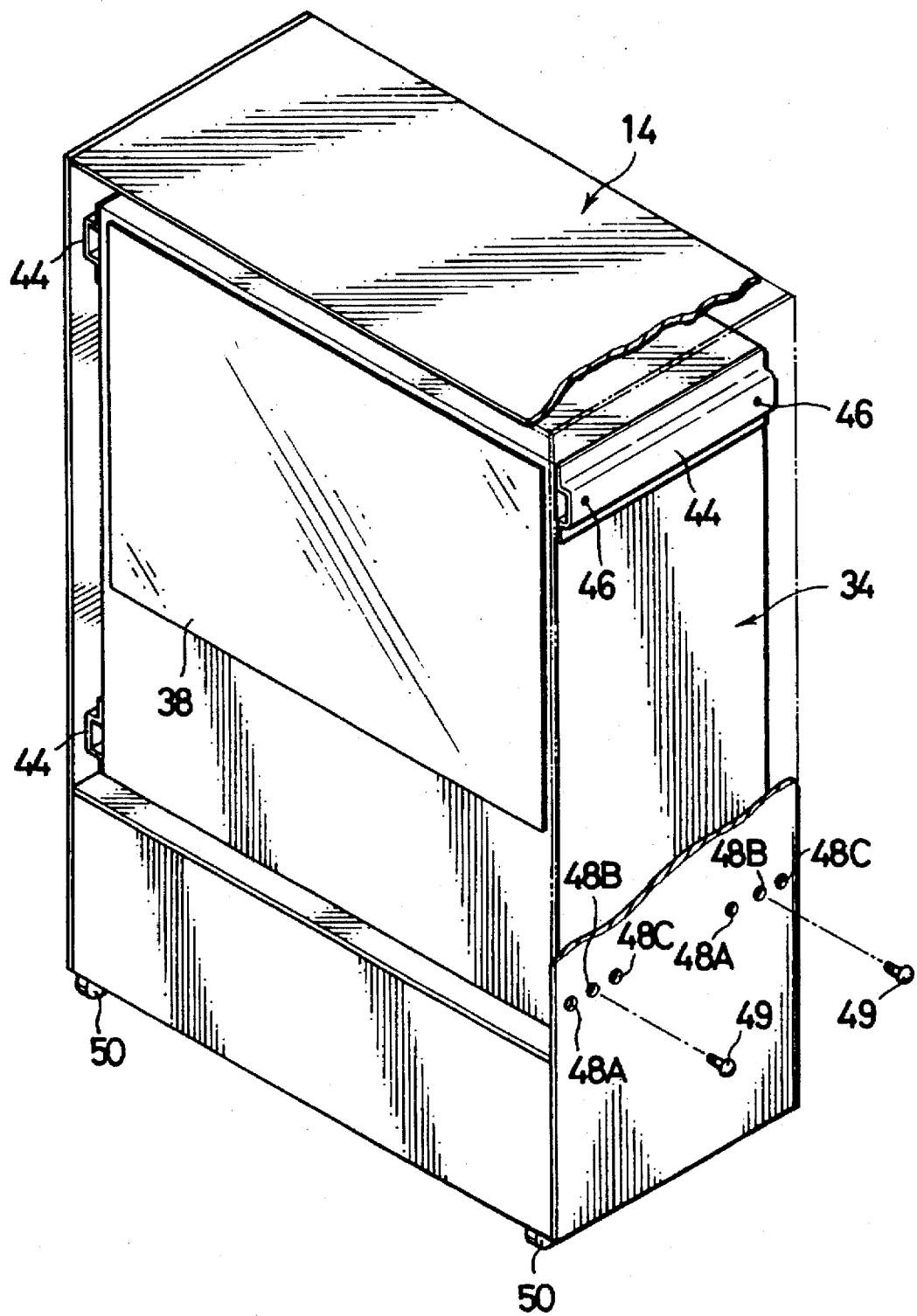
FIG. 3 is a partially cutaway perspective view of a projector housing provided in the game machine.

A preferred embodiment of the invention is now described referring to FIGS. 1 to 3. A game machine shown in FIGS. 1 and 2 comprises, from left (player's side) to right, a playing cabinet 10 at the front, a diorama mounting cabinet 12 at a middle section and a projector mounting cabinet 14 at a rear section. There is provided an operating panel 16 at the top of the playing cabinet 10. The playing cabinet 10 incorporates a controller (not shown) which is connected to a simulated gun 20 to be operated by a player 18.

A semitransparent mirror 22 is mounted in the upper half of the diorama mounting cabinet 12 at approximately the height of the line of sight of the player 18 standing in front of the playing cabinet 10. The semitransparent mirror 22 is fixed at a slant angle of 45° in such a way that its lower edge lies closer to the player 18 than its upper edge and the angle θ1 equals the angle θ2, as depicted in FIG. 1.

A diorama mounting plate 24 is installed above the semitransparent mirror 22 and diorama objects 26, 27 facing downward are attached to the bottom side of the diorama mounting plate 24. The diorama object 26 has the shape of a human face. The diorama objects 26, 27 are illuminated by a lamp (not shown). Positional relationships between the diorama objects 26, 27 and semitransparent mirror 22 are such that light reflected by the diorama objects 26, 27 is directed to the semitransparent mirror 22, which reflects the incident light toward the player 18 (i.e., to the front of the game machine). With this arrangement, virtual images of the individual diorama objects 26, 27 are formed behind the semitransparent mirror 22 as viewed from the player 18. Positions P1 and P2 where these virtual images are formed are at the same distances behind the semitransparent mirror 22 as the distances d1 and d2 between the diorama objects 26, 27 and the semitransparent mirror 22, respectively. A facial image 29 as shown in FIG. 2, for instance, is therefore formed at position P1.

In FIG. 1, indicated at 28 is a transparent protective screen for protecting the diorama objects 26, 27. Since the diorama mounting plate 24 can be removed through a front opening 30 together with the diorama objects 26, 27, it is possible to replace the diorama objects 26, 27 as the need arises to do so.

At a lower position of the projector mounting cabinet 14, there is provided a supporting board 32 on which a projector housing 34 is mounted. Provided at the bottom of the projector housing 34 are rollers 36 which can roll on the supporting board 32 so that the projector housing 34 can be moved backward and forward as viewed from the player 18.

The projector housing 34 has in its front wall a large rectangular through hole 34a and a screen 38 is mounted immediately in front of the through hole 34a. The projector housing 34 incorporates a CRT 40 and a total reflection mirror 42 which constitute together an image projector. The CRT 40 and total reflection mirror 42 are so arranged that an image displayed on the CRT 40 is reflected by the total reflection mirror 42 and projected onto the screen 38. In this embodiment, the image displayed on the CRT 40 includes eyes and a mouth of a human face. Individual image elements such as the eyes and mouth are projected onto the screen 38 in such a way that they can be superimposed at their appropriate positions on the facial image 29.

As illustrated in FIG. 3, two each fixing brackets 44 are attached to the right and left sides of the projector housing 34. These fixing brackets 44 extending horizontally from the front to the back at upper and lower positions have a U-shaped cross section and protrude outward from the right and left side walls of the projector housing 34. A pair of screw holes 46 are tapped in the protruding portion of each fixing bracket 44 close to its front and rear ends. On the other hand, there are provided front and rear through holes 48B at upper and lower positions of each side wall of the projector mounting cabinet 14. Each of these through holes 48B is associated with additional through holes 48A and 48C which are located slightly forward and rearward, respectively. More particularly, the individual through holes 48A–48C, by which the projector housing 34 is fixed in specific positions, are arranged in the following positional relationships:

A) Through holes 48A: These through holes are provided where they coincide with the screw holes 46 when the projector housing 34 is so located that its front aligns with the left-hand alternate long and two short dashed line shown in FIG. 1. At this front position, the screen 38 lies closer to the player 18 than the position P1 where the virtual facial image 29 of the diorama object 26 is formed.

B) Through holes 48B: These through holes are provided where they coincide with the screw holes 46 when the projector housing 34 is located at the position shown by solid lines in FIG. 1. At this middle position, the screen 38 lies slightly to the rear of the position P1 where the virtual facial image 29 of the diorama object 26 is formed.

C) Through holes 48C: These through holes are provided where they coincide with the screw holes 46 when the projector housing 34 is so located that its back aligns with the right-hand alternate long and two short dashed line shown in FIG. 1. This position lies further to the rear of the above-mentioned middle position.

In determining a fixing position of the projector housing 34, the screw holes 46 in the four fixing brackets 44 are matched with the through holes 48A, 48B or 48C, whichever desired, and screws 49 are passed through the through holes 48A, 48B or 48C. The projector housing 34 is then secured to the projector mounting cabinet 14 at one of the three positions (forward, middle or rearward) by tightening the screws 49.

In FIGS. 1 and 3, indicated at 50 are casters on which the playing cabinet 10, diorama mounting cabinet 12 and projector mounting cabinet 14 are mounted.

Described below is how the aforementioned mechanism works in the game machine. Inside the diorama mounting cabinet 12, the virtual images of the diorama objects 26, 27 are reflected toward the player 18 by the semitransparent mirror 22. The image projected onto the screen 38 passes through the semitransparent mirror 22 and mixed with the virtual images of the diorama objects 26, 27. A combined, or superimposed, image is therefore perceived by the player 18. If the projector housing 34 is set at the middle position in the projector mounting cabinet 14 as shown by the solid lines in FIG. 1, the image elements of human eyes and mouth projected onto the screen 38 are positioned a little behind the facial image 29 which is the virtual image of the diorama object 26. This arrangement will create a countenance with slightly recessed eyes.

If the projector housing 34 is set at the front position as indicated by the left-hand alternate long and two short dashed line in FIG. 1, the image elements of human eyes and mouth are positioned a short distance to the front of the facial image 29. This arrangement will create a countenance with slightly projected eyes.

On the contrary, if the projector housing 34 is set at the rear position as indicated by the right-hand alternate long and two short dashed line in FIG. 1, the image elements of human eyes and mouth are positioned well behind the facial image 29. The resulting countenance will be featured with much recessed eyes.

It be understood from the foregoing discussion that depth relationships of specific facial features can be varied by using the same mechanism of the game machine. This significantly increases the flexibility of three-dimensional visual presentation compared to the earlier-mentioned conventional arrangements, in which depth relationships of individual image elements can not be changed.

In this embodiment, images of human eyes (points Q in FIG. 2) projected onto the screen 38 are located immediately behind the facial image 29 which is the virtual image of the diorama object 26 when the projector housing 34 is set at the middle position shown by solid lines in FIG. 1. Therefore, when the player 18 stands at a left position S1 shown in FIG. 2, the human eye images projected behind the facial image 29 seem to be gazing at the player 18 from points T1. Similarly, when the player 18 stands at a right position 2 shown in FIG. 2, the human eye images projected behind the facial image 29 seem to be gazing at the player 18 from points T2. This means that the player 18 feels as if the eyes in the facial image 29 are looking directly at the player 18 no matter where the player 18 stands.

If the diorama object 26 is replaced with a larger one, the resulting facial image (i.e., a virtual image of the diorama object 26) is shown by alternate long and two short dashed lines 29' in FIG. 2. Provided that the screen 38 is kept at the middle position, one of the human eye images as seen from the player 18 will overlie a projecting nose 29a' of the facial image 29', resulting in a somewhat strange look. To prevent this from happening, the embodiment allows the projector housing 34 to be moved forward by changing its fixing position from the middle through holes 48B to the front through holes 48A when the diorama object 26 is replaced with the larger one. As a result, the position of the human eye images (points Q in FIG. 2) is slightly shifted to the front so that a normal appearance is obtained without any overlap between images of the eyes and nose 29a'.

Figure 4:
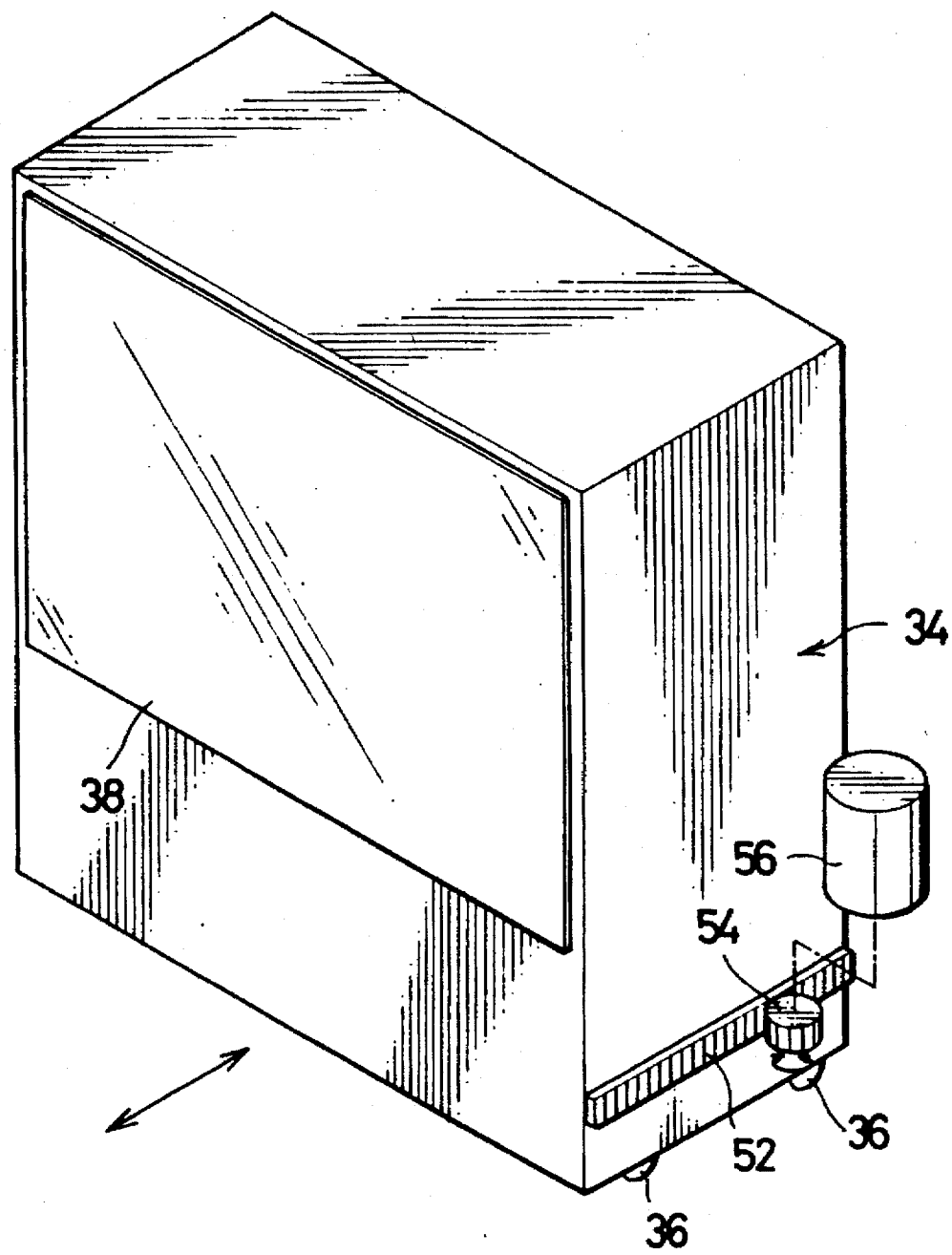
FIG. 4 is a perspective view of another projector housing.

Another projector housing and drive mechanism for the projector will be shown in FIG. 4. In this embodiment, a rack 52 extending horizontally from the front to the back are attached to one side of the projector housing 34. The rack 52 engages with a pinion 54 which is connected to a motor 56 incorporating a reduction gear. As the pinion 54 is turned by the motor 56 which is fixed to the projector mounting cabinet 14, the projector housing 34 is moved forward or rearward.

According to this embodiment, the position of the projector housing 34 can be varied even while the player 18 is playing at the game machine. It may therefore be possible to move the eyes of the facial image 29 between their recessed and projected positions in such an event that the player 18 has just succeeded in shooting the facial image 29 with the simulated gun 20, for instance, to give enhanced excitement and amusement.

While the invention has been described with reference to its preferred embodiments, modifications are possible without departing from the spirit of the invention. Described below are some of such alternative forms of the invention.

(1) The game machine depicted in FIG. 1 may be modified in such a manner that the diorama objects 26, 27 are located directly in the line of sight of the player 18 who looks straight toward the screen 38. In this modified arrangement, the diorama objects 26, 27 overlie the image projected onto the screen 38. Since the on-screen image is partially hidden by the diorama objects 26, 27, the integrity of the combined image is remarkably degraded. Compared to this arrangement, the aforementioned preferred embodiments employ the semitransparent mirror 22 to form semitransparent virtual images of the diorama objects 26, 27. Since the on-screen image can be seen through the semitransparent virtual images of the diorama objects 26, 27, it is possible to place the screen 38 either behind or in front of the virtual images. It may therefore be appreciated that the arrangement of the preferred embodiments significantly enhances the flexibility of visual presentation.

(2) The game machine depicted in FIG. 1 may also be modified in such a manner that the diorama objects 26, 27 are mounted in an upward-looking position within a lower part of the diorama mounting cabinet 12. In this case, the semitransparent mirror 22 should be mounted at an angle of 45°—slanting in the opposite direction to what is shown in FIG. 1 so that the virtual images of the diorama objects 26, 27 are formed in their correct forward-looking position. In the previously-described preferred embodiments, the diorama objects 26, 27 are mounted facedown at an upper position of the diorama mounting cabinet 12. The diorama objects 26, 27 themselves are less recognizable for the player 18 when installed in the upper position than in the lower position. It may therefore be appreciated that the arrangement of the preferred embodiments is effective in providing a more realistic visual presentation.

(3) The game machine depicted in FIG. 1 may be so modified that the diorama objects 26, 27 and the semitransparent mirror 22 are integrated into a single unit which can be moved backward and forward instead of moving the projector housing 34. This modified arrangement also makes it possible to vary depth relationships between the virtual images of the diorama objects 26, 27 and the on-screen image. In the previously-described preferred embodiments, the screen 38 is mounted to the front of the projector housing 34 which incorporates the image projector comprising the CRT 40 and total reflection mirror 42, and the projector housing 34 is made movable backward and forward within the projector mounting cabinet 14. It be appreciated that the arrangement of the preferred embodiments is effective in that relative positions of the virtual images of the diorama objects 26, 27 and the on-screen image can be easily varied by simple depth movements of the projector housing 34.

(4) The invention may also be embodied in such a way that the image shown on the CRT 40 is directed straight toward the player 18 without using the total reflection mirror 42. In this modified arrangement, the image on the CRT 40 can be superimposed with the virtual images of the diorama objects 26, 27 to give three-dimensional effects. In the previously-described preferred embodiments, the image to be superimposed is projected onto the screen 38 from inside the projector housing 34. The arrangement of the preferred embodiments makes it possible to form a large-sized image in a cost-effective manner, and yet the image can be moved backward and forward by just moving the projector housing 34.

(5) The visual presentation provided by the game machine is not limited to the facial image 29 (29') and its eyes and mouth, etc. As an example, there may be shown a landscape on the screen 38 and an image of an automobile-shaped diorama object may be superimposed thereupon. The invention can be used to simulate various other images suitable for specific scenes in individual games.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A game machine comprising:
    a diorama object; and
    an image generator arranged behind the diorama object in such a way that an image formed by the image generator is superimposed on an image of the diorama object in a specified depth relation, and the image of the diorama object and the image formed by the image generator are movable in depth directions relative to each other.

2. A game machine as defined in claim 1, wherein:
    the diorama object has the shape of a human face; and
    the image generator is operable to form at least an image of eyes at a position appropriately corresponding to the image of the diorama object.

3. A game machine as defined in claim 1, wherein the diorama object is arranged outside a viewing zone of the image formed by the image generator, further comprising:
    a virtual image forming device which forms a virtual image of the diorama object over the image formed by the image generator.

4. A game machine as defined in claim 3, wherein the virtual image forming device includes a semitransparent mirror which is disposed between the diorama object and the image formed by the image generator in such a posture as to reflect the image of the diorama object to a player.

5. A game machine as defined in claim 3, wherein:
    the diorama object has the shape of a human face; and
    the image generator is operable to form at least an image of eyes at a position appropriately corresponding to the virtual image of the diorama object.

6. A game machine as defined in claim 5, wherein the relative movement of the virtual image of the diorama object and the image formed by the image generator is set in such a range that the image of eyes is behind the virtual image of the diorama object.

7. A game machine as defined in claim 5, wherein the relative movement of the virtual image of the diorama object and the image formed by the image generator is set in such a range that the image of eyes is in front of the virtual image of the diorama object.

8. A game machine as defined in claim 7, further comprising a mechanism which moves the image of eyes between front and rear positions of the virtual image of the diorama object.

9. A game machine as defined in claim 1, wherein the image generator is made movable in depth directions.

10. A game machine as defined in claim 9, wherein the image generator includes:
    a projector housing movable in depth directions;
    a screen provided in the projector housing; and
    a projector provided in the projector housing for projecting a desired image on the screen.

11. A game machine as defined in claim 10, further comprising a diorama housing supporting the diorama object, the diorama housing having a portion for holding the projector housing in a plurality of positions different from one another in depth directions.

12. A game machine as defined in claim 10, further comprising a drive mechanism which moves the projector housing in depth directions relative to the diorama housing.

* * * * *